April 21, 1970 J. H. C. WELLS 3,508,250

DEVICE FOR RANGE SWITCHING ANALOG VALUES FROM FIRST TO SECOND RANGES TO PRECISELY DETERMINE DIGITAL VALUE FROM ANALOG QUANTITY

Filed May 17, 1966 2 Sheets-Sheet 1

INVENTOR.
JOHN H. C. WELLS
BY Frank R. Trifari
AGENT

INVENTOR.
JOHN H. C. WELLS
BY Frank R. Trifari
AGENT

United States Patent Office 3,508,250
Patented Apr. 21, 1970

3,508,250
DEVICE FOR RANGE SWITCHING ANALOG VALUES FROM FIRST TO SECOND RANGES TO PRECISELY DETERMINE DIGITAL VALUE FROM ANALOG QUANTITY

John Harold Charles Wells, Horsham, England, assignor, by mesne assignments, to U.S. Philips Corporation, New York, N.Y., a corporation of Delaware Filed May 17, 1966, Ser. No. 550,860
Claims priority, application Great Britain, May 17, 1965, 20,739/65
Int. Cl. H03k 13/175
U.S. Cl. 340—347 3 Claims

ABSTRACT OF THE DISCLOSURE

An analog-to-digital converter utilizing a series of comparators operative over a first range for generating a first level digital signal, a logic circuit connected to the comparators and responding to the indicated comparator range for re-setting a second range into the comparators. The final digital signal is thereby formed with high accuracy.

This invention relates to analogue-to-digital converters and is particularly concerned with such converters to which a rapidly changing input is applied.

Most known forms of analogue-to-digital converters are able to deal only with relatively slowly changing inputs or otherwise are only able at best to give an output value which lies somewhere between the maximum and minimum values of input which were present during the digitizing time. This is true, for example, in the case of known converters operating on the successive approximation principle. However, this output will not have a determinate time and will merely fall within the digitizing time of the converter. If, for any given input, it is known that there will not be a change of more than a given percentage of full scale during the digitizing time when the converter output will be a value which occurred during the digitizing time and the input at the start of this time must be within the given percentage of the output value, thus the accuracy of the output value is within the said given percentage.

This accuracy can be improved on by monitoring the converter during the conversion process or in some circumstances, by examining the serial output value at the end of the digit time in order to determine when, in respect of a certain digit time, the finally obtained output signal value came closest to the original input value. The information thus obtained will not, if for example, it is to be used for plotting a graph, give regular indications on the time base but this is of minor importance when the accuracy can be substantially improved. The accuracy can thus be expressed as being approximately equal to the percentage change of input during digitization time divided by the number of digits.

Even this improved accuracy is not good enough for many applications and it is an object of the present invention to provide an analogue-to-digital converter capable of giving an improved accuracy over that hitherto available and which is particularly applicable to rapidly changing input levels.

According to a first aspect of the present invention an analogue-to-digital converter includes a plurality of comparators each connected with an analogue input signal point, logic apparatus connected to the outputs of the said comparators, clock means associated with the logic apparatus switching means connecting the logic apparatus to the inputs of the comparators and arranged to change the range of the comparators on instructions from the logic apparatus, and output means associated with the logic apparatus from which a digital indication of the value of an analogue input signal is arranged to be obtained.

In one form of the converter it has ten comparators and operates on a decade system. The clock means may have a total count of one hundred periods during the allowed digitizing time.

According to a second aspect of the present invention a method of converting an analogue signal to a digital signal comprises feeding at the commencement of a digitizing period the analogue signal to a plurality of comparators each set to accept a different level of signal, monitoring the outputs of the comparators to determine which comparator gives a signal corresponding to coincidence with the analogue signal at a definite time of the digitizing period or failing such a signal, to determine which two successive comparators have different outputs indicating that the signal lies between the levels of these two comparators, resettng the comparators to narrower levels, feeding the subsequent analogue signal to the comparators at the commencement of a following digitizing period and monitoring the outputs of the comparators as before.

A plurality of time-multiplex analogue signals may be certain circumstances be fed to the input of the converter and processed simultaneously by storing the results obtained for each channel and reapplying these results during succeeding measurements on the corresponding channels.

In order that the invention may be readily understood, one example of an analogue-to-digital converter will now be described by way of example only with reference to the drawings.

Figure 3A:
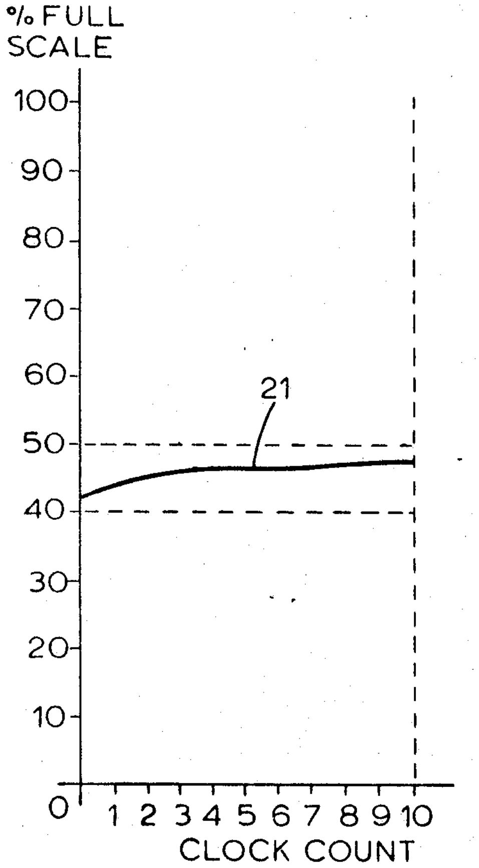
Figure 3B:
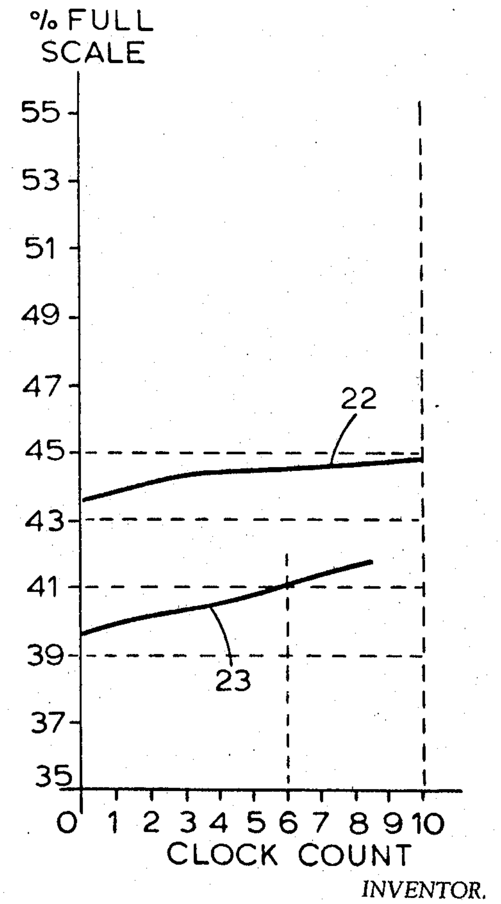

FIGURES 3*a* and 3*b* two diagrams illustrating the operation of the converter.

Figure 1:
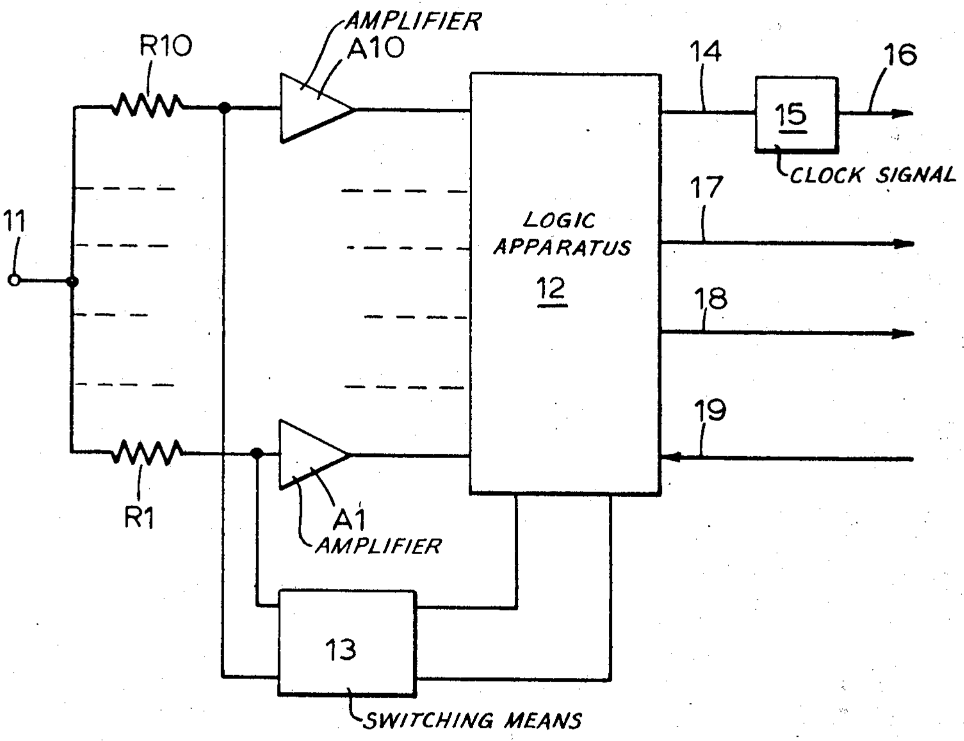
FIGURE 1 shows in diagrammatic form the layout of the converter.

Referring now to FIGURE 1 of the drawings, the converter comprises ten comparators each including a resistor $R_1$ . . . $R_{10}$ respectively and an associated amplifier $A_1$ . . . $A_{10}$. Each resistor is connected on one side to an input terminal 11 and the outputs of the comparators fed into logic apparatus 12. A feed-back loop between the logic apparatus 12 and the inputs to the amplifiers $A_1$ . . . $A_{10}$ includes switching means 13 used to switch two decades of digit resistors in and out of circuit as required. Thus each comparator may be set to operate at any value from zero to full scale in increments of 1% of full scale with better than 0.1% accuracy. The logic apparatus also has connected to it by a line 14 a clock 15 which feeds 100 pulses of digital time from its output 16 to a recorder not shown. An output 17 of the apparatus 12 is also connected to this recorder to give a digital value reading and a further output 18 gives an indication of the accuracy range which in this case is either ±1% or ±0.1%. A digitize command signal is fed into the logic apparatus 12 at its input 19 to start a cycle of operation of the converter.

Figure 2:
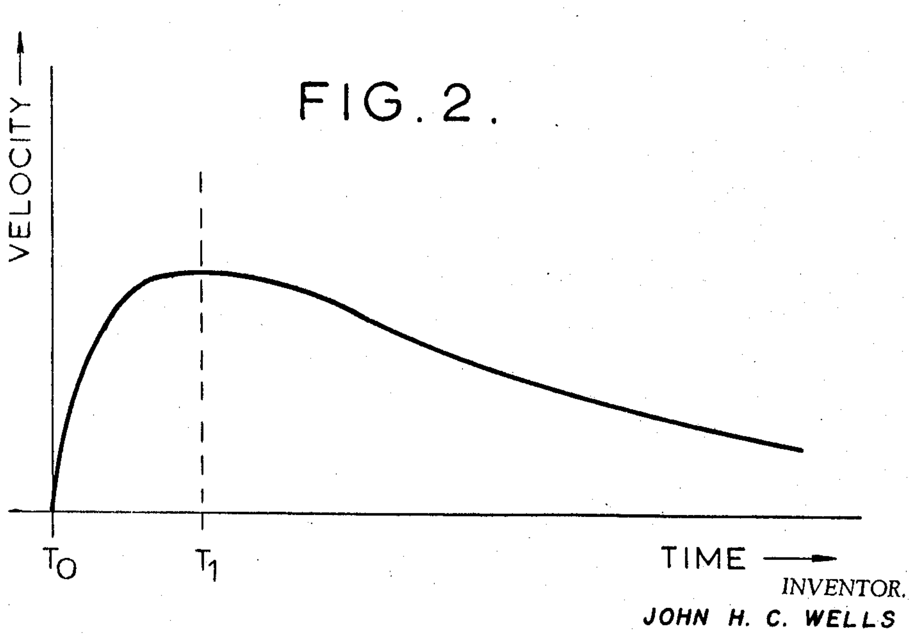
FIGURE 2 shows a velocity/time diagram of a projectile.

It is assumed that the analogue-to-digital converter is to be used to plot the graph of a projectile fired from a gun. The graph will have a form as shown in FIGURE 2 from which it will be noted that there is a rapid change of velocity with respect to time in acceleration period $T_0$ to $T_1$ and then a gradual change of velocity after $T_1$. It is assumed that the input signal has a rate of change of 10% of full scale during the time of a digitizing period, i.e. the period during which the converter operates, and that the waiting time between successive digitizing periods is comparatively short, i.e. between 5–10% of the time of a digitizing period, which is just sufficient for the comparators and the clock to be reset.

For convenience in FIGURE 3 this digitizing period is indicated by the clock count of 100, marked in units of 10 on the horizontal axis, and not in seconds. The sets of digit resistors $R_1 \ldots R_{10}$ are initially set up so that the ten comparators are each balanced at input signals at intervals of 10% from zero to full scale as indicated in FIGURE 3A. If an input signal occurs during the digitizing period received after the first digitize command signal received over line 19 and which input signal, shown at 21, has a value which varies between say 40% and 50% of full scale for the whole of the digitizing period all the amplifiers $A_1$ to $A_4$ will give an output of one polarity and the amplifiers $A_5$ to $A_6$ will give an output of opposite binary polarity into the logic apparatus 12. The apparatus 12 will recognize that the change takes place between 40% and 50% of full scale and thus the level of the signal has been recognized with a 10%, or ±5% accuracy.

The logic apparatus 12 then sets at the end of the digitizing period the switching means 13 so that it switches further resistors into circuit with the amplifiers $A_1$ to $A_{10}$ so that the comparators now extend over a 20% scale with 2% difference between adjacent comparators. A 20% scale is chosen on either side of the centre value of the 10% range, i.e. in this example 10% on either side of 45, since the maximum rate of change in a digitizing period is 10% of full scale either up or down. The scale is now as shown in FIGURE 3B.

If at the start of the next digitizing period the curve follows the path indicated by 22 and does not exceed the 45% level or drop below the 43% level then from a similar process to that described with reference to FIGURE 3A at the end of the digitizing period the states of the comparators will be recognized and amplifiers $A_1$ to $A_4$ will be giving an output of one polarity and amplifiers $A_5$ to $A_{10}$ will be giving an output of the opposite polarity. The level of the signal will now be known within 2% i.e. with the accuracy of ±1%.

However, if the curve had followed path 23 instead of path 22 then at the count 60 indicated by B on the horizontal ordinate it would have crossed the boundary level of 41% and the comparator including amplifier $A_3$ would have changed state to stop the clock. When the clock stops it is then known that at that moment the input signal had an exact value and this can be noted and recorded on the recorder for use in plotting the graph of FIGURE 2. After this recording has been made the switching means 13 is reset to cover the ±10% band for the next reading in the following digitizing period.

It will be seen that if the input signal is changing rapidly then a reading of switch/comparator accuracy (in this example ±0.1%) will be obtained. If the input signal is temporarily stationary or slow moving then a 0.1% reading is less likely and only a ±1% reading may be obtained. This is usually exactly what is required in many applications, where a ±0.1% reading is obtained every time when the signal is changing rapidly, and a ±0.1% reading is obtained less often when the signal is changing slowly.

The indication as to whether a reading is ±0.1% or ±1% is given by whether or not the clock has stopped.

If the signal tracking is lost for some reason, e.g. a signal changing outside specification of more than 10% during successive digitize commands, then this will be shown by all comparator outputs being of one polarity and the signal is relocated by spacing the comparator levels at 10% intervals as in the beginning. Thus only one reading will be lost and this is clearly indicated as a false reading.

It will be seen that the output is obtained by giving the time at which a signal achieved an exact value, rather than the exact value at the digitize command time. A reading of accuracy of ±0.1% is obtained every time a digitize command pulse is given provided the input signal is changing at least 2% during the digitize command interval and proportionately less often, on average, if the rate of change is slower than this, when readings of ±1% are given for the remaining digitize commands. A clear indication over lines 17 or 18 is given as to whether a reading is ±0.1% or ±1%, and as to whether an outside specification rate of change makes a reading inaccurate.

This is in contrast to a known converter not in accordance with the invention which would have delivered an inaccurate and meaningless reading every time if the signal is changing by more than 0.1% at each interval, and which would have given no indication that the reading is in error.

The time jitter superimposed on the digitize command pulse is little disadvantage where graphs or a computer is used to analyse the readings, since the actual delay is known, and the mental gymnastics involved in interpreting printed columns of figures is rapidly acquired with practice.

Since previous converters could only be used for readings changing 0.1% during an interval between successive digitizing periods whereas the proposed system gives accurate readings for inputs changing 10% during this time, an aperture time gain of 100 is achieved.

Furthermore, known converters set the digit switches, and required the comparator amplifiers to respond, at the digit rate of the instrument, which is say 10 to 20 times the digitize command rate, thus by use of the invention the digitize command rate can without modification be increased by a factor of 10 or 20 over a known converter using the same parts giving a total aperture time gain of 1000 to 2000.

Many variations in the converter described above, for example, the number of parallel comparators could be reduced at the expense of aperture time by increasing the clock count, or by reducing the accuracy.

There is also a possibility of modifying the converter, e.g. by letting the clock free run and recording the reading without stopping the clock. Then the digitize command rate could be automatic at each clock zero. Also the clock could be allowed to run on until stopped, when the converter would automatically reset and continue. Thus only 0.1% readings would be produced whether the signal was slow or fast moving, that is, the instrument would automatically give the cross over points, at 1% levels, to 0.1% accuracy, regardless of input rate of change.

The converter may also readily be rearranged to accept slower or faster maximum rate of change than the 10% given in the example.

It may be easier to use an odd number of comparators to cover a ± range in order to have one in the centre and in fact nine would be sufficient to cover the 0–100% range at 10% intervals, since the 0 and 100 levels are not essential.

The relationship of clock total count does not depend on comparator spacing but on the ratio of allowable rate of change and required accuracy only. In order to understand this, if it is assumed that a signal is changing by 10% during the digitizing time and, during this time, cuts a comparator level, then a count of 10 will define the level to one tenth of this i.e. 1% and a count of 100 will be needed to define the level to 0.1%. Closer spacing of comparators will only give several intersections during the digitizing time, and only the first will be used. Closer spacing will still improve the chance of 0.1% reading, for slowly moving signals.

Summarizing, specification describes a method and apparatus for converting an analog signal level to a corresponding digital indication. To accomplish the foregoing, a series of comparators are employed. An analog signal is introduced simultaneously to each comparator. Each comparator will compare the signal level with an internal threshold and provide an output indicating whether the input signal is greater or lesser than the threshold. In the specification, the threshold mechanism is illustrated as a switch for placing proper valued resistors in each comparator so as to create different range levels for comparison with the input signal. The manner in which the thres5holding is accomplished is well known and conventional, involving little more than application of Ohm's Law. For example, the switch 13 could operate to place biased resistors to the junction of each resistance R and amplifier A. When an input level exceeds the bias, a positive output is derived, when it does not exceed the bias, a negative output is derived. When a different set of ranges are desired, a different set of switched resistors can be selected. The logic circuit 12 acts to select the range desired. Since the primary range is clearly indicated by the changeover from a positive to negative comparator signal, the desired secondary range can be then selected. Again, the technique for the latter selection is conventional and in fact could be done manually, as by merely switching that group of range resistors desired in accordance with the particular comparator which indicates that the level lies within its primary range. Clearly, the foregoing techniques symbolized by blocks 12 and 13 need not be elaborated upon as any practitioner skilled in the art can easily drive circuits or methods of accomplishing the functions stated in columns 2 and 3 of the instant specification.

What is claimed is:

1. An apparatus for converting an analog signal to a digital signal during a digitizing period comprising a common point for receiving an analog signal, a plurality of comparators, means connecting said point to an input of each of said comparators, each of said comparators set to detect differing non-overlapping ranges of signal input levels, all of said comparators together operative over a primary range of signal levels corresponding to an initial range of digital equivalent signal levels, a logic circuit for determining in which of said comparators lies the said analog signal, a switching circuit connecting said logic circuit to each of said comparators for range switching each of said comparators to a further range of signal input levels including said analog signal, all of said comparators together operative over a secondary range of signal levels substantially reduced over said primary range, output means connected to said logic circuit for determining the digital level of said analog signals at the end of said digitizing period, a source of clock pulses for setting said digitizing period, means applying said clock pulses to said logic circuit for timing the operation of said apparatus, and means for stopping said source of clock pulses when said analog signal level reaches the range level between successive converters, thereby ending said digitizing period.

2. The combination of claim 1 including means for resetting the said comparators at the end of said digitizing period.

3. An apparatus for converting an analog signal to a digital signal during a digitizing period comprising a common point for receiving an analog signal, a plurality of comparators, means connecting said point to an input of each of said comparators, each of said comparators set to detect one range of signal input levels, all of said comparators together operative over a primary range of signal levels corresponding to an initial range of digital equivalent signal levels, a logic circuit for determining in which of said comparators lies the said analog signal, a switching circuit connecting said logic circuit to each of said comparators for range switching each of said comparators to a further range of signal input levels including said analog signal, all of said comparators together operative over a secondary range of signal levels substantaily reduced over said primary range, output means connected to said logic circuit for determining the digital level of said analog signals at the end of said digitizing period, and including a source of clock pulses for setting said digitizing period, and means applying said clock pulses to said logic circuit for timing the operation of said apparatus.

References Cited

UNITED STATES PATENTS

| | | | |
|---|---|---|---|
| 2,922,151 | 1/1960 | Reiling | 340—347 |
| 2,991,461 | 7/1961 | Sturgeon | 340—347 |
| 3,050,713 | 8/1962 | Harmon | 340—347 |
| 3,133,278 | 5/1964 | Mills | 340—347 |
| 3,193,668 | 7/1965 | Clapper | 340—347 |
| 3,277,462 | 10/1966 | Sekimoto | 340—347 |

MAYNARD R. WILBUR, Primary Examiner

M. K. WOLENSKY, Assistant Examiner